(12) United States Patent
Park et al.

(10) Patent No.: US 7,805,244 B2
(45) Date of Patent: Sep. 28, 2010

(54) ATTITUDE CORRECTION APPARATUS AND METHOD FOR INERTIAL NAVIGATION SYSTEM USING CAMERA-TYPE SOLAR SENSOR

(75) Inventors: Choon Bae Park, Seoul (KR); Kee Young Choi, Incheon (KR); Se Ah Jang, Incheon (KR)

(73) Assignee: INHA University, Incheon (KR)

( * ) Notice: Subject to any disclaimer, the term of this patent is extended or adjusted under 35 U.S.C. 154(b) by 795 days.

(21) Appl. No.: 11/743,063

(22) Filed: May 1, 2007

(65) Prior Publication Data
US 2009/0326816 A1 Dec. 31, 2009

(30) Foreign Application Priority Data
May 30, 2006 (KR) .................. 10-2006-0049001

(51) Int. Cl.
*G01C 21/00* (2006.01)
(52) U.S. Cl. .................. 701/213; 701/4; 701/9; 701/220; 244/158.1; 340/937; 340/974
(58) Field of Classification Search ............ 701/4, 701/5, 9, 123, 220, 221; 244/158.1; 340/937, 340/967, 974
See application file for complete search history.

(56) References Cited
U.S. PATENT DOCUMENTS
5,899,945 A * 5/1999 Baylocq et al. ............ 701/4

2002/0004691 A1 * 1/2002 Kinashi et al. ............ 701/4
2005/0060092 A1 * 3/2005 Hablani ............ 701/213
2006/0146136 A1 * 7/2006 Cho ............ 348/207.1

FOREIGN PATENT DOCUMENTS
JP 10-082656 3/1998

* cited by examiner

*Primary Examiner*—Gertrude Arthur Jeanglaud
(74) *Attorney, Agent, or Firm*—IPLA P.A.; James E. Bame

(57) ABSTRACT

Disclosed herein is an attitude correction apparatus for an Inertial Navigation System (INS) using a camera-type solar sensor. The present invention relates to a system for correcting errors occurring in an inertial navigation system, in which inertial sensors, such as gyroscopes and accelerometers are combined with each other to calculate the attitude, velocity and position of an airplane, and to an apparatus for utilizing a sun-line of sight vector, generated by a camera-type solar sensor, that uses images of the moving sun, and the output value of the inertial navigation system, thus correcting the attitude of an airplane and the errors of sensors. The attitude correction apparatus of the present invention includes a camera-type solar sensor for detecting the sun, a signal processing unit for receiving and synchronizing information, and a data collection processing unit for performing post-processing on information, thus correcting an error.

8 Claims, 7 Drawing Sheets

ATTITUDE CORRECTION APPARATUS AND METHOD FOR INERTIAL NAVIGATION SYSTEM USING CAMERA-TYPE SOLAR SENSOR

CROSS REFERENCE

This application claims foreign priority under Paris Convention and 35 U.S.C. §119 to Korean Patent Application No. 10-2006-0049001, filed May 30, 2006 with the Korean Intellectual Property Office.

BACKGROUND OF THE INVENTION

1. Field of the Invention

The present invention relates, in general, to an attitude correction apparatus for an Inertial Navigation System (INS) using a camera-type solar sensor and, more particularly, to a system for correcting errors occurring in an inertial navigation system, in which inertial sensors, such as a gyroscope and an accelerometer, are combined with each other and are adapted to calculate the attitude, velocity and position of an airplane, and to an apparatus for analyzing a sun-line of sight vector, generated by the camera-type solar sensor using an image of the moving sun and the output value of the inertial navigation system, thus correcting the attitude of an airplane and the errors of sensors.

2. Description of the Related Art

Generally, representative devices for measuring the motion status of an airplane include an Inertial Measurement Unit (IMU) for measuring angular velocity and acceleration, an Attitude Heading Reference System (AHRS) for measuring angular velocity and acceleration and calculating an attitude and an azimuth angle, and an Inertial Navigation System (INS) for measuring angular velocity and acceleration and calculating all of an attitude, velocity and position. Each of the above devices is composed of inertial sensors, such as a gyroscope for measuring angular velocity and an accelerometer for measuring acceleration.

Thanks to the rapid development of the electronics industry, the performance of various types of sensors used in airplanes has rapidly improved for a given cost thereof. Sensors having the same function have been developed toward small size, light weight and low cost. Owing to the improvement of the performance versus cost of various types of parts, various new development projects using the parts have been attempted. The development of an Unmanned Aerial Vehicle (UAV) is a representative example of such development projects. Generally, in a conventional UAV, expensive parts, which perform integrated functions and have high precision and high reliability, are installed. Therefore, the development of an UAV system has been restrictively conducted only by large-scale enterprises or large-scale laboratories. However, in the past 10 years, because of the rapid development of low-priced and small-sized sensors, systems having these sensors installed therein can be implemented by universities or even by individuals, and thus such systems have rapidly spread in the world.

Such a small-sized UAV tends to be similar to a conventional expensive UAV from the standpoint of at least control or elementary navigation. However, in the case of navigation equipment implemented using low-priced and small-sized sensors, the maximum precision that has been realized to date is insufficient to install the navigation equipment in the UAV and to stably perform a guidance and navigation function for a long period of time. Therefore, in the case of UAVs developed by several universities in nations that are advanced in the field of aeronautics, an expensive AHRS or INS is generally installed.

Meanwhile, as the number of small-scale enterprises that combine various kinds of low-priced sensors with each other to implement an IMU or AHRS and sell the IMU or AHRS has rapidly increased, and because the size of markets therefor has increased, competition is becoming intense. For companies that assemble commercial parts to construct systems without having fundamental technologies, the technical levels thereof have been gradually made uniform. For example, the IMU from Cloud Cap Technology weighs less than 20 grams and measures angular velocity and acceleration on three axes. The IMU uses RS232 communication and the Controller Area Network (CAN) protocol, operates at a rate of 200 Hz or above, and has a price of less than 2,000 dollars.

As another example, there is an automatic flight control system which develops from Crista IMU, and which has a maximum dimension of about 10 cm, weighs 210 grams, and has a price of 7,500 dollars. Enterprises that develop and produce such automatic flight control systems may include various companies other than Cloud Cap, for example, Crossbow, MicroPilot, etc. As described, such products have relatively low prices, and have functions that were impossible to implement at such low prices in the prior art.

FIG. 9 is a diagram showing the operating method of a typical Strapdown Inertial Navigation System (SINS). The basic operating principles of the method indicate a scheme for integrating angular velocity, as measured by a gyroscope, calculating the attitude angle of a payload, obtaining a coordinate transformation matrix on the basis of the attitude angle, transforming acceleration components in a local coordinate system, measured by an accelerometer, into components in an inertial coordinate system using the coordinate transformation matrix, and integrating the components in the inertial coordinate system, thus calculating velocity and position.

In FIG. 9, when it is assumed that, for example, an offset (bias) error exists in an angular velocity measured using a gyroscope, it can be seen that an offset error in an attitude angle gradually increases while an integral calculation process continues over time. The error in an attitude angle or direction cosine matrix is propagated in the form of an error in the calculation of velocity and position, thus deteriorating the overall reliability of the calculation results Therefore, it is evident that perfect correction at the level of the parts of a gyroscope and an accelerometer is essentially required. However, an important problem is that there is a physical limitation in improvement of the precision of a system implemented using low-priced sensors. That is, since the magnitude of proof mass is limited, the amplification factor becomes inevitably large, and thus the system is more sensitive to noise.

Further, since a recent system has developed toward a system enabling mass production and supply for the purpose of low-cost supply, the correction of precision at the level of sensors is difficult, and variation in the characteristics of the sensors is sensitively affected by variation in the external environment. Even if correction at the level of the sensors is satisfactorily performed, errors in attitude, position and velocity inevitably accumulate when the system is continuously used for a long period of time, as in the case of long-distance navigation. That is, it can be seen that an INS using only an IMU has a tendency to generate divergent errors. The use of auxiliary sensors capable of performing mutual compensation is a method which has been proposed as a method of overcoming divergent errors and which is actively being developed.

An IMU is advantageous in that it generally has high-speed response characteristics and is not influenced by disturbance. However, the IMU has properties in that the output of the sensors of a gyroscope or accelerometer is accumulated, so that precise correction at the level of the sensors is essential, and the IMU is greatly influenced by the results of precise correction. However, when low-priced sensors are combined with other and used, there is a limitation in the improvement of the precision and accuracy of sensors in general, so that products using the sensors necessarily have errors which are divergent. For a method of overcoming divergent errors, research on a method of maximizing efficiency using both signals generated in the IMU, and signals measured by sensors having non-divergent error characteristics, such as a Global Positioning System (GPS), by utilizing auxiliary sensors, such as the GPS or a magnetometer, has recently been conducted. Such a technology is referred to as integrated navigation. Among technologies pertaining to integrated navigation, the most promising technology that has been actively developed is a system in which an INS and a GPS are combined with each other. The basic flowchart of this system is shown in FIG. 10.

A GPS is one of the sensors used to detect translation velocity and position in an inertial coordinate system. A GPS sensor can generally detect a current position of an airplane anywhere in the world with an error of the range of several tens of meters, and has a characteristic such that errors are not divergent, unlike the INS. The position estimated using signals output from a gyroscope and an accelerometer has errors increasing with the lapse of time. These errors are corrected using a position signal output from the GPS, and error characteristics used for correction are fed back both into the gyroscope and the accelerometer, and thus error correction is performed in real time. The GPS generally has an operating rate lower than that of the INS. Therefore, a GPS having high specification, among GPSs used for unmanned aerial vehicles, operates at a rate of about 10 Hz, and a GPS used for a general-purpose receiver generally operates at an operating rate of about 1 Hz. Therefore, in the case of an INS operating at a rate of about 200 Hz, a procedure for calculating attitude and position 200 times using the signals output from a gyroscope and an accelerometer, correcting the attitude and the position on the basis of position data if the position data is output from the GPS after one second has elapsed, and varying error characteristics, is continuously repeated, thus maximally utilizing the advantages of the INS, and minimizing the influence of divergent errors. Recently, since a GPS receiver gradually has light weight and low price, a low-priced INS used for small-sized unmanned aerial vehicles also has taken such a structure.

This structure has extended to a system in which auxiliary sensors, other than GPS, are combined with the INS. For example, a scheme of combining a magnetometer and an atmospheric sensor with the INS has been attempted. The magnetometer uses a method of estimating the attitude of an airplane using variation in a magnetic field vector on the basis of the fact that a detected magnetic vector varies according to attitude. The atmospheric sensor uses a method of correcting the INS using an atmospheric velocity, or velocity and altitude information output from an altimeter. As described above, all of these auxiliary sensors have error characteristics indicating non-divergent errors. Recently, the number of auxiliary sensors combined with the INS gradually increases, and thus there may occur the case where the INS, the GPS, the magnetometer, and the atmospheric sensor are used together for medium or greater scale unmanned aerial vehicles in cooperation with each other.

However, it is apparent that a method of improving error characteristics using such an integrated sensor is not a method of ultimately compensating for deficiency of the precision and accuracy of a low-priced INS. Such a fact influences the reliability of a system, and shows that different characteristics are exhibited according to the type of auxiliary sensors. For example, in the case of INS/GPS combination which is most actively used, the interruption of GPS signals may fatally influence the reliability of a system. It is well known that the reception state for GPS signals is not necessarily excellent even if there is a gradual improvement. The causes of a failure in reception state may include intentional or unintentional communication disturbance, such as jamming, inferiority of the arrangement of visible satellites, etc.

Therefore, when divergent error of a low-priced INS is intended to be corrected using the GPS, the error of the INS appears without being corrected if no GPS signal is received, and thus the control, guidance and navigation of a system dependent on the low-priced INS may cause fatal results. The magnetometer also has weakness in such external factors. That is, the error of the magnetometer increases around an object strongly influencing a magnetic field, such as a high voltage wire or a magnetic body, and resulting data obtained from the magnetometer is not reliable. The atmospheric sensor cannot easily obtain precise data under various conditions of wind, temperature, density, etc. That is, such sensors have defects indicating that they are weak in external environmental factors.

Therefore, in order to overcome the defects, a method of integrally using various sensors is used. In this case, the conclusion that auxiliary sensors for integrated navigation must be implemented to be insensitive to external environments can be reached.

FIG. 11 illustrates the properties of a typical integrated navigation system. A solid line indicates the case where a precise INS is used, and a dotted line indicates the case where a low-priced imprecise INS is used. 'x' denotes a position signal measured by a GPS. The two INSs receive a correction signal from the GPS, and use the correction signal. Although not presented herein, position errors did not diverge over time even though the correction of the error constants of the INSs is slightly erroneous when the GPS operates normally. The results presented herein are obtained by interrupting a GPS signal in some intervals and evaluating the effects thereof in the above-described case. Referring to the results shown in FIG. 11, it can be seen that, in the case of the precise INS, a linear trace is relatively excellently maintained, whereas, in the case of the imprecise INS, errors rapidly accumulate when the correction signal from the GPS disappears.

In the case of the INS implemented using low-priced imprecise sensors, it is necessary to perform correction using auxiliary sensors, but, in this case, the auxiliary sensors require characteristics such that divergent errors are prevented and such that insensitivity to the external environment is realized.

Further, research on the control of the attitude of an airplane using a visual sensor and on the use of the visual sensor for navigation has been variously conducted. Since a visual sensor is stably operated without being influenced by the external environment when weather conditions are good, the visual sensor may be the most reliable sensor if the limited operation range thereof is taken into consideration. However, an attitude indicator using the currently proposed visual sensor is problematic in that the processing speed thereof is not sufficiently fast to be used to control an airplane in the case of typical images.

Another problem, occurring when an image output from the visual sensor is used without change, resides in that, if a moving object, such as a vehicle, is included in objects on the earth when an attempt is made to use the objects on the earth, it is difficult to determine the effects of the motion of the object relative to the motion of an airplane. In order to solve the above problem, a method using features such as the horizon has been proposed and used, but this method is also problematic in that it is also sensitive to the environment.

Attempts to construct a navigation system using commercial inertial sensors and GPS sensors that have limited precision, but have excellent performance versus cost and are easily obtained in the navigation systems field, and to realize the automatic flight and navigation of small-sized unmanned aerial vehicles using the navigation system, are constantly being made all over the world. Further, companies related to avionics and having various sizes are making efforts to improve the efficiency of navigation systems that use integrated navigation. Small-scale venture enterprises and medium-scale companies arising therefrom are intensely competing with each other in every aspect of the combination of INS with GPS, which is strongly associated with the explosive increase in the market for small-sized unmanned aerial vehicles. Navigation equipment is the core of the automatic flight control system of both manned and unmanned aerial vehicles. It can be sufficiently predicted that, if stable and reliable navigation equipment is popularized, the demand for unmanned aerial vehicles using such equipment will rapidly increase. The market for low-cost navigation equipment will also increase for unrelated reasons.

SUMMARY OF THE INVENTION

Accordingly, the present invention has been made keeping in mind the above problems occurring in the prior art, and an object of the present invention is to provide an attitude correction apparatus and method for an inertial navigation system using a camera-type solar sensor, which prevent errors from being divergent, and are insensitive to variation in the external environment.

The present invention uses a sun-line of sight vector without using complicated visual images. The sun-line of sight vector can be measured using an analog or digital solar sensor, or can be obtained by performing simple processing on images taken from a digital camera. Such a sun-line of sight vector is used as a signal required to generate reference data at the time of performing correction. The sun-line of sight vector can be very easily acquired, unlike conventional attempt to use typical images.

The excellent advantage, obtained when the sun-line of sight vector is used, is in that there is no aspect thereof that is sensitive to external environments, other than weather conditions. In order to detect the components of a sun-line of sight vector in an earth reference coordinate system, position and time must be known. The easiest method of detecting position and time is to operate a given system in association with a Global Positioning System (GPS). In this case, time and position can be precisely known, and thus this method is ideal. However, since the sun-line of sight vector is not very sensitive to time or position (for example, 15 degrees for an error of 1 hour), the attitude correction apparatus of the present invention may use the clock of an Inertial Navigation System (INS), and may use the position and time information provided by the INS. Therefore, the attitude correction apparatus of the present invention is advantageous in that normal operation is possible without a GPS.

The only restrictive condition of the operation of such a system is that a sun-line of sight vector must be detected through observation. For this operation, clouds must not hide the sun, and no obstacle can be disposed between sun-line of sight vectors. However, such a restrictive condition may not constitute a major problem upon actual operation. In practice, most medium-scale unmanned aerial vehicles, as well as low-cost small-scale unmanned aerial vehicles, are flown only when weather conditions are very excellent. Further, the operation altitude of an unmanned aerial vehicle is generally much greater than the altitude obscured by buildings, so that the case where a sun-line of sight vector is hidden by an obstacle rarely occurs. Therefore, the above-described restrictive condition may not be a major factor when actual operating conditions are taken into consideration. Further, when the concept arising from this operation is applied and advanced, the present invention can be applied to all cases where a long-distance sun-line of sight vector is available.

Therefore, another object of the present invention is to provide an attitude correction apparatus and method for an inertial navigation system using a camera-type solar sensor, which are insensitive to variation in the external environment and can be normally operated without requiring a GPS through the use of a sun-line of sight vector, which can be very simply and easily obtained.

In order to accomplish the above objects, the present invention provides an attitude correction apparatus, which analyzes an image of the sun acquired by a camera-type solar sensor fixed to a moving object, and values output from an inertial navigation system, thus correcting an error in attitude and a sensor error. The attitude correction apparatus comprises a camera-type solar sensor for detecting a sun using a camera in order to measure an attitude of an airplane; a signal processing unit for receiving attitude and position values from the inertial navigation system and information about a sun-line of sight vector from the camera-type solar sensor, and synchronizing the attitude and position values with the sun-line of sight vector information; and a data collection processing unit for performing post-processing on information received from the signal processing unit, thus correcting an error.

Preferably, the camera-type solar sensor may comprise the camera, a camera driving motor unit, on which the camera is mounted, and which is adapted to perform rotational motion, and an image acquisition processor for acquiring an image required for data processing from the camera, and detecting a position of the sun from the acquired image.

Preferably, in order to perform the three-dimensional motion of the camera, the camera driving motor unit may comprise a panning shaft driving motor; a panning rotating plate coupled to and rotated along with the panning shaft driving motor; a panning shaft installed on a center portion of the panning rotating plate; a tilting shaft driving motor installed on the panning shaft; first and second tilting shaft driving motor gears coupled to and rotated along with the tilting shaft driving motor; a tilting shaft installed on the second tilting shaft driving motor gear; a tilting rotating plate installed on the tilting shaft, and adapted to fixedly install the camera on the tilting rotating plate; and tilting shaft supports for supporting both ends of the tilting shaft.

Preferably, the camera-type solar sensor may comprise the camera, and an image acquisition processor for acquiring an image required for data processing from the camera and detecting a position of a sun from the acquired image, and wherein two or more camera-type solar sensors may be installed along a body of the airplane.

Preferably, the data correction processing unit may receive the values from the inertial navigation system and the solar sensor and thus calculate an estimated error value using a Kalman filter algorithm.

Preferably, the data collection processing unit may further comprise a Global Positioning System (GPS) in addition to the inertial navigation system and the solar sensor, thus more precisely calculating estimated errors of velocity and position, as well as an estimated error in attitude, using the Kalman filter algorithm.

In addition, the present invention provides an attitude correction method for an inertial navigation system using a camera-type solar sensor, wherein information about an attitude of an airplane is extracted through comparison of a sun-line of sight vector in a navigation coordinate system with a sun-line of sight vector in a body coordinate system generated by the camera-type solar sensor, and an error in attitude is corrected using the information about the attitude of the airplane.

Preferably, a method of correcting the error in attitude may comprise the steps of (a) a camera capturing an image of a sun through rotation of a camera driving motor unit included in the camera-type solar sensor; (b) an image acquisition processor receiving the captured image, and thus calculating the sun-line of sight vector in the body coordinate system in consideration of an angle of motion of the camera driving motor unit; (c) synchronizing the sun-line of sight vector, calculated at step (b), with information about attitude, velocity and position obtained by an inertial navigation system, using a signal synchronization microprocessor of a signal processing unit; (d) a data collection processor of a data collection processing unit receiving the synchronized information, and estimating an error in attitude using a Kalman filter, which is an algorithm for minimizing a mean square error between an actual value and an estimated value; and (e) transmitting the estimated error to the inertial navigation system, thus correcting the attitude of the airplane.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of an attitude correction apparatus for an inertial navigation system using a camera-type solar sensor according to the present invention will be described in detail with reference to the attached drawings.

Figure 1A:
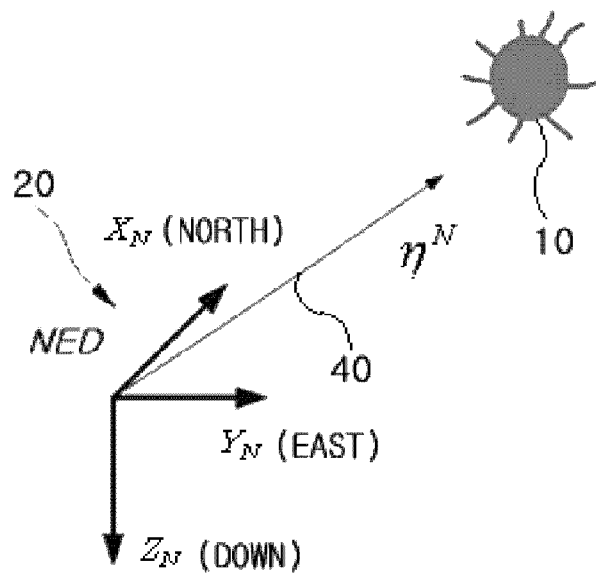
FIG. 1A is a diagram showing a sun-line of sight vector in a navigation coordinate system ($X_N, Y_N, Z_N$) according to the present invention.
Figure 1B:
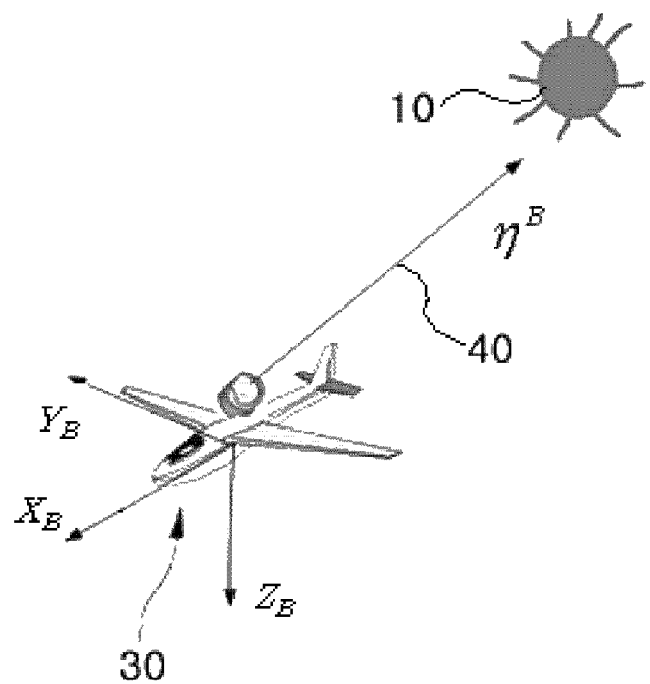
FIG. 1B is a diagram showing a sun-line of sight vector in a body coordinate system ($X_B, Y_B, Z_B$) using a camera-type solar sensor according to the present invention.
Figure 2:
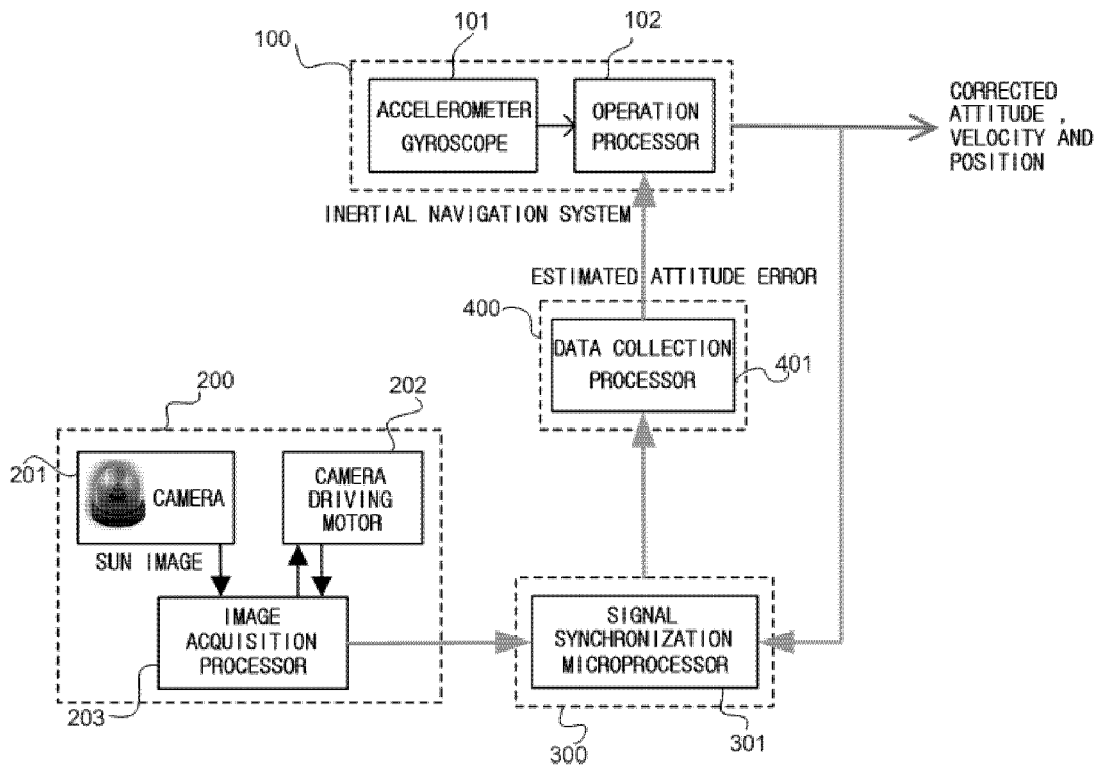
FIG. 2 is a block diagram showing signal processing for attitude correction by an inertial navigation system using a camera-type solar sensor according to the present invention.
Figure 3:
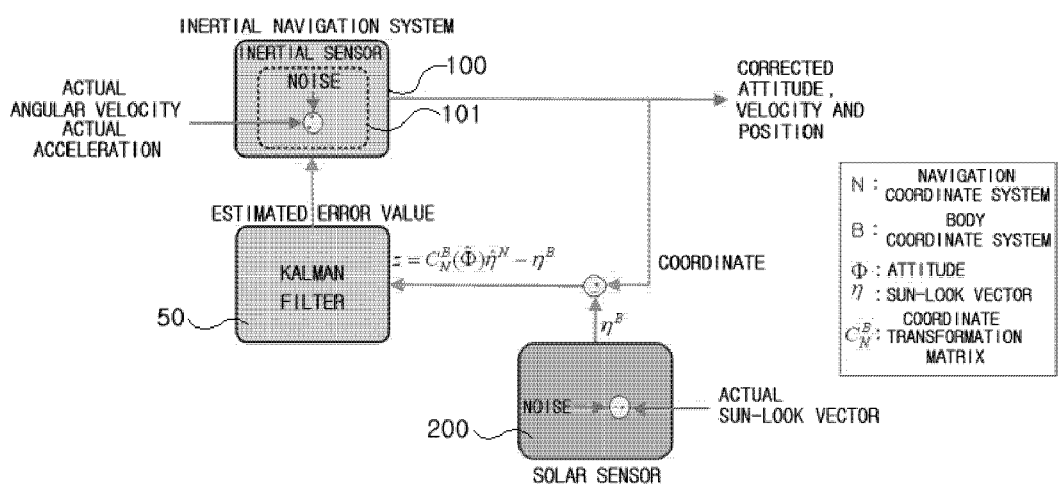
FIG. 3 is a flow diagram showing an attitude correction algorithm performed by an inertial navigation system using a camera-type solar sensor according to the present invention.
Figure 4:
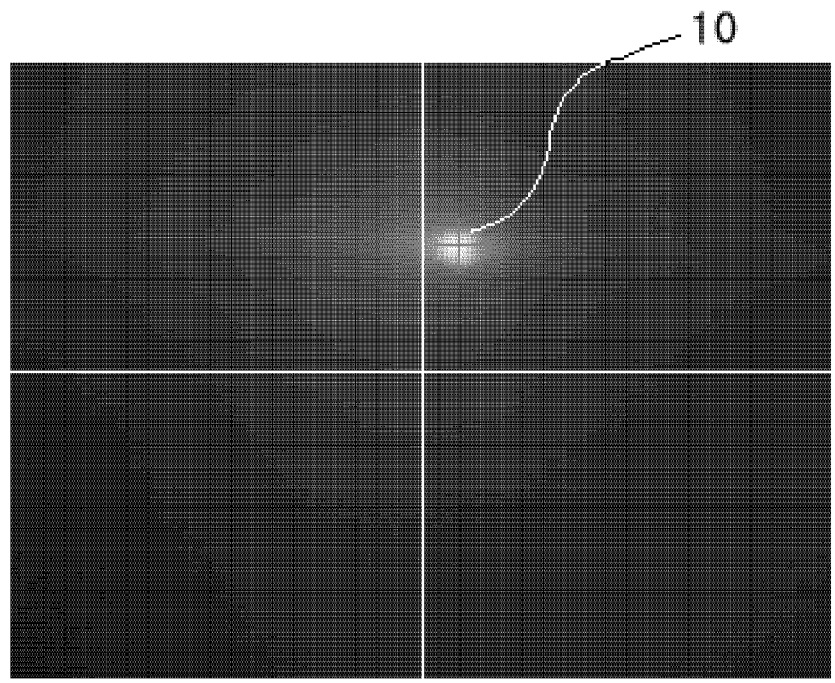
FIG. 4 is a diagram showing the image of the sun captured by a camera according to the present invention.
Figure 5:
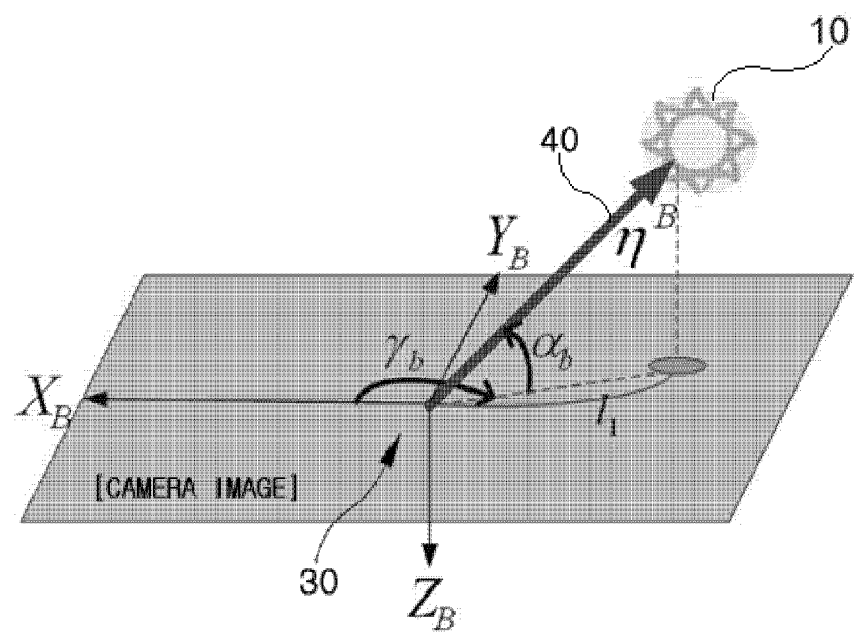
FIG. 5 is a diagram showing the relationship between the captured sun image of FIG. 4 and a sun-line of sight vector.
Figure 6:
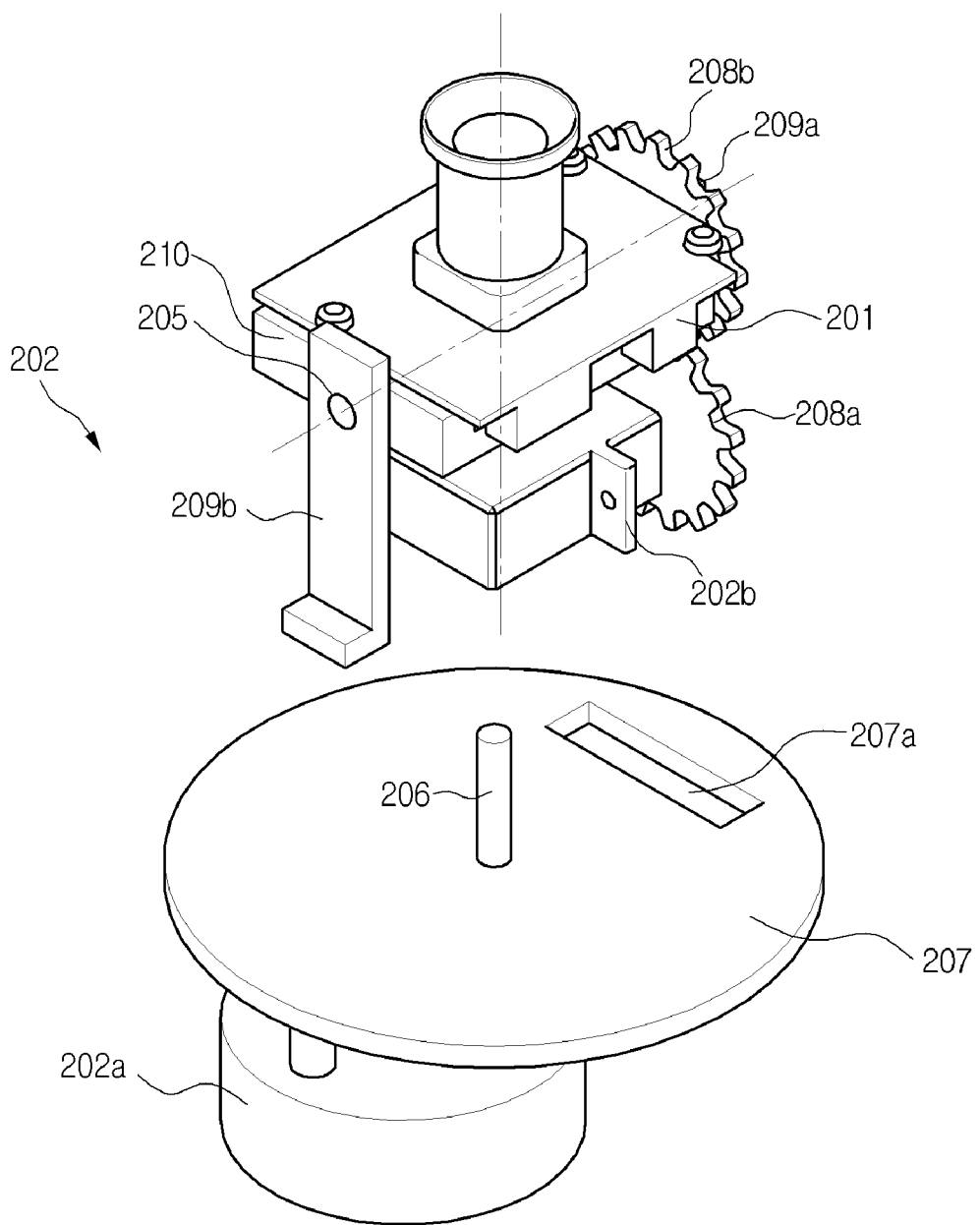
FIG. 6 is a diagram showing a camera driving motor unit according to the present invention.
Figure 7:
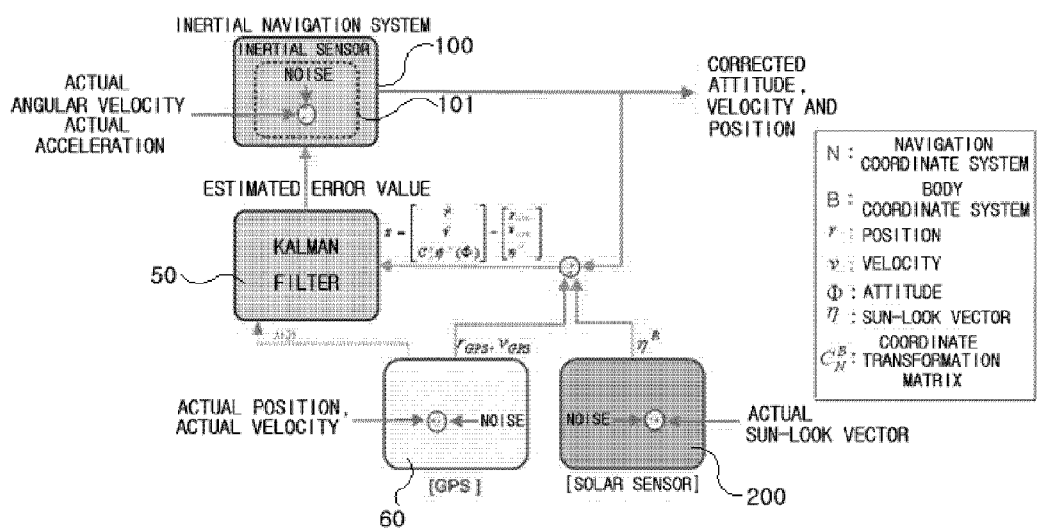
FIG. 7 is a diagram showing another embodiment of an attitude correction apparatus for an inertial navigation system using a camera-type solar sensor according to the present invention.
Figure 8:
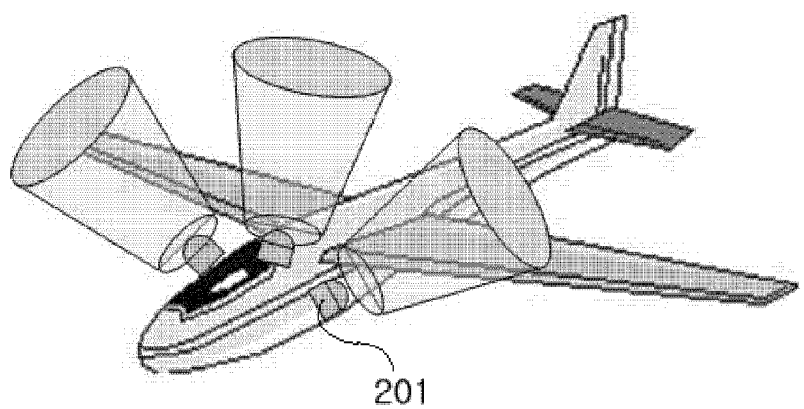
FIG. 8 is a reference diagram showing a further embodiment of an attitude correction apparatus for an inertial navigation system using a camera-type solar sensor according to the present invention.
Figure 9:
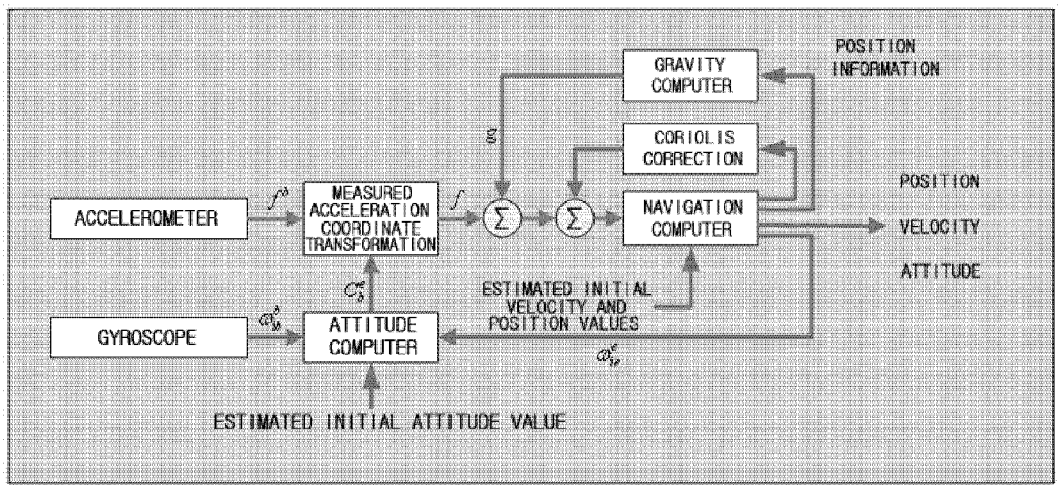
FIG. 9 is a flow diagram showing the operating method of a typical strapdown INS to describe the technical field of the present invention.
Figure 10:
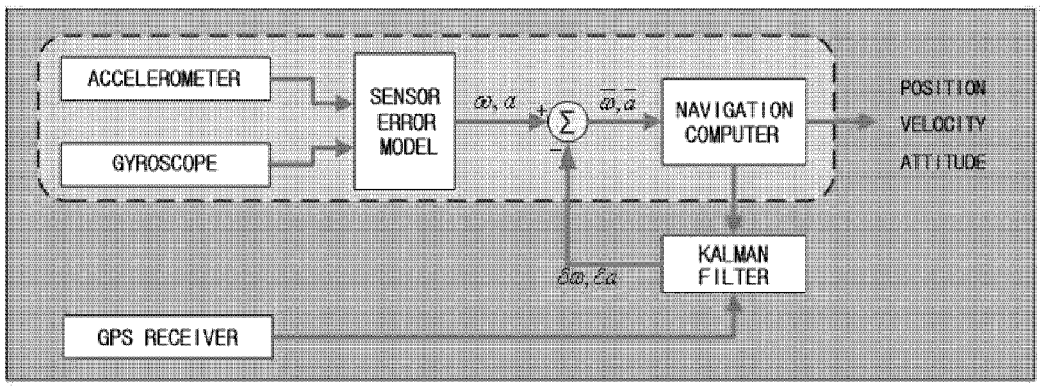
FIG. 10 is a flow diagram showing an integrated navigation system, in which an INS is combined with a GPS, to describe the technical field of the present invention.
Figure 11:
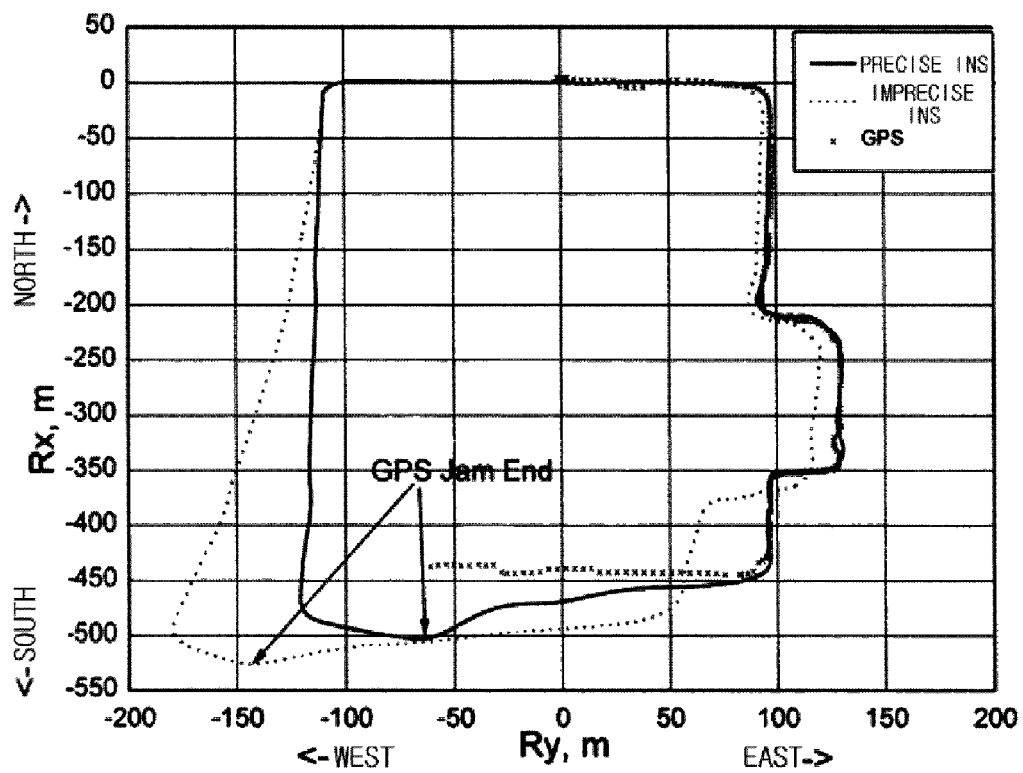
FIG. 11 illustrates experimental values showing the influence of GPS signal interruption in the integrated navigation system using the GPS to describe the technical field of the present invention.

FIG. 1A is a diagram showing a sun-line of sight vector in a navigation coordinate system ($X_N, Y_N, Z_N$) according to the present invention, FIG. 1B is a diagram showing a sun-line of sight vector in a body coordinate system ($X_B, Y_B, Z_B$) using a camera-type solar sensor according to the present invention, FIG. 2 is a block diagram showing signal processing for attitude correction by an inertial navigation system using a camera-type solar sensor according to the present invention, FIG. 3 is a flow diagram showing an attitude correction algorithm performed by an inertial navigation system using a camera-type solar sensor according to the present invention, FIG. 4 is a diagram showing the image of the sun captured by a camera according to the present invention, FIG. 5 is a diagram showing the relationship between the captured sun image of FIG. 4 and a sun-line of sight vector, FIG. 6 is a diagram showing a camera driving motor unit according to the present invention, FIG. 7 is a diagram showing another embodiment of an attitude correction apparatus for an inertial navigation system using a camera-type solar sensor according to the present invention, and FIG. 8 is a reference diagram showing a further embodiment of an attitude correction apparatus for an inertial navigation system using a camera-type solar sensor according to the present invention.

First, the sun-line of sight vector 40 used in the present invention is described. A vector directed to the sun 10 and having a magnitude of 1 is the sun-line of sight vector 40. There is only one sun-line of sight vector 40, but, if different coordinate systems having differently arranged axes are used, the lengths of respective axes are differently represented. Respective axial components of the sun-line of sight vector 40 in a body coordinate system 30 fixed to an airplane vary according to the attitude of the airplane in which sensors are installed, and also vary according to the position of the airplane (longitude and latitude) on the earth. If the position and time of the airplane are given, as shown in FIG. 1A, the components of the sun-line of sight vector 40 in a navigation coordinate system (North-East-Down coordinate system: NED coordinate system) 20, which is parallel to the earth's surface and has three axes oriented in northward, eastward and downward directions, are calculated based on solar geometry. As shown in FIG. 1B, in the case of the sun-line of sight vector 40 in the body coordinate system 30 measured using a camera-type solar sensor 200, the coordinate system is rotated according to the attitude of the airplane, and thus the sun-line of sight vector 40 also varies.

Through the comparison of the sun-line of sight vectors 40 in the two different coordinate systems 20 and 30, information about the attitude of the airplane can be extracted and can be used for attitude correction.

Next, the construction and operation of the attitude correction apparatus for the inertial navigation system using the camera-type solar sensor according to the present invention are described below. In order to correct the attitude error of an inertial navigation system 100, when a camera 201 captures the image of the sun through the rotation of a camera driving motor unit 202 included in a camera-type solar sensor 200, as shown in FIG. 2, an image acquisition processor 203 receives the image from the camera 201, performs image processing on the image to detect the position of the sun, and calculates a sun-line of sight vector 40 in a body coordinate system 30 in consideration of the angle of the motion of the camera driving motor unit 202. Thereafter, the sun-line of sight vector 40 in the body coordinate system 30, obtained by the camera-type solar sensor 200, is synchronized with the attitude, velocity and position information obtained by the inertial navigation system 100 using the signal synchronization microprocessor 301 of a signal processing unit 300. The information synchronized in this way is input to the data collection processor 401 of a data collection processing unit 400, so that an error in the attitude of an airplane is estimated using a Kalman filter 50, which is an algorithm for minimizing the mean square error between an actual value and an estimated value, in the data collecting processor 401. The error estimated in this way is transmitted to the inertial navigation system 100, and thus the position of the airplane is corrected.

Hereinafter, the construction and operation of the attitude correction apparatus are described in detail below.

The image captured by the camera 201 of the camera-type solar sensor 200 of FIG. 4 is an image obtained through a filter, which is installed in consideration of the bright light of the sun 10. The image acquisition processor 203 detects the center position of the brightest portion of the screen so as to detect the center position of the sun 10. The brightest portion of FIG. 4 indicates the sun 10, and a cross indication in the center portion is the center position of the sun 10 as detected by the image acquisition processor 203.

Next, as shown in FIG. 5, the sun 10 is projected onto a two-dimensional image screen. In this case, the length of a line $l_1$ extending from the center position of the image to the center position of the sun 10 is calculated using the number of pixels. For example, the length of a line extending from the center position of the image to a point that is spaced apart from the center position of the image by 20 pixels in a horizontal direction and by 80 pixels in a vertical direction is calculated as $\sqrt{20^2+80^2}=82.46$.

The sun-line of sight vector 40, an altitude angle $\alpha_b$, and the length of the line extending from the center position of the image to the center position of the sun 10 have the following relationship in the body coordinate system 30.

$$\tan(90-\alpha_b)=K \times l_1$$

$$\alpha_b=90-\tan^{-1}(K \times l_1)$$

In this case, $\alpha_b$ is the altitude angle of the sun-line of sight vector, K is a proportional constant, and $l_1$ is the length of the line extending from the center position of the image to the center position of the sun.

Therefore, when the proportional constant between the length of the line extending to the center position of the sun 10 and the altitude angle is detected, the altitude angle can be calculated. In this case, the proportional constant K, the reciprocal of the distance from the focus to the CCD (Charged-coupled device), can be obtained using an experiment for measuring the maximum field of view of the camera 201, and the equation thereof is represented below.

$$K = \frac{\tan(\text{maximum horizontal field of view of camera}/2)}{\text{maximum number of horizontal pixels of camera}/2}$$

Further, when the center position of the image is the center position of a clock, an azimuth angle $\gamma_b$ can be calculated from the angle at which the line extending to the center position of the sun 10 is rotated relative to a reference position. In this way, the altitude angle and the azimuth angle of the sun 10 can be calculated using a simple trigonometric function. Further, the sun-line of sight vector 40 can be calculated using simple trigonometric functions. The equation of the sun-line of sight vector 40 is described below.

$$\eta^B = \begin{bmatrix} \cos\alpha_b \cos\gamma_b \\ \cos\alpha_b \sin\gamma_b \\ -\sin\alpha_b \end{bmatrix}$$

In this case, $\eta^B$ is the sun-line of sight vector in the body coordinate system The camera driving motor unit 202 of the camera-type solar sensor 200 is required in order to overcome the disadvantage in that the entire sky cannot be photographed by the camera 201 due to the small field of view of the camera 201, and is capable of performing rotational motion about a tilting shaft 205 and rotational motion about a panning shaft 206, as shown in FIG. 6.

In detail, in the camera driving motor unit 202 of the camera, a panning shaft driving motor 202a is installed on a lower portion thereof, and a panning rotating plate 207 coupled to and rotated along with the panning shaft driving motor 202a is formed over the panning shaft driving motor 202a. The panning rotating plate 207 has a rectangular slot formed in the border thereof so as to allow a first tilting shaft driving motor gear 208a, which will be described later, to pass therethrough. The panning rotating plate 207 is preferably installed to be spaced apart from the panning shaft driving motor 202a so as to enable tilting motion. Further, the panning shaft 206 is installed on the center of the top of the panning rotating plate 207, and a tilting shaft driving motor 202b is fixedly installed on the panning shaft 206. The first tilting shaft driving motor gear 208a is installed at the tilting shaft driving motor 202b, and a second tilting shaft driving motor gear 208b, engaged with and rotated along with the first tilting shaft driving motor gear 208a, is installed to be connected to the first tilting shaft driving motor gear 208a.

The tilting shaft 205 is inserted into the second tilting shaft driving motor gear 208b, and a tilting rotating plate 210 required to fixedly install the camera 201 is installed on the tilting shaft 205. Tilting shaft supports 209a and 209b for supporting both ends of the tilting shaft 205 are fixedly installed on the panning rotating plate 207.

Therefore, the camera 201 is fixedly installed on the tilting rotating plate 210, so that three-dimensional motion of the camera driving motor unit 202 is possible depending on whether the panning shaft driving motor 202a and the tilting shaft driving motor 202b are operated.

Further, the image acquisition processor 203 transforms the coordinates of the sun-line of sight vector 40, obtained from the image of the sun 10, captured by the camera 201 through the three-dimensional motion of the camera driving motor unit 202, using a tilting angle and a panning angle, and thus finally calculates the sun-line of sight vector 40 as the sun-line of sight vector 40 in the body coordinate system 30. Further, the image acquisition processor 203 transmits a signal to the camera driving motor unit 202 so as to prevent the sun 10 from escaping from the screen in consideration of the direction in which the sun 10 moves within the screen, and obtains information about the angle of the movement of the sun.

Next, the signal synchronization microprocessor 301 of the signal processing unit 300 synchronizes the data of the inertial navigation system 100 with the data of the camera-type solar sensor 200 and transmits the synchronized data to the data collection processing unit 400 when the data of the camera-type solar sensor 200 is updated with respect to the inertial navigation system 100, which has a relatively short calculation time, and the camera-type solar sensor 200, which has a relatively long calculation time.

The data collection processing unit 400 performs a procedure of estimating the attitude of an airplane using the information received from the signal processing unit 300.

First, in order to calculate the sun-line of sight vector 40 in the navigation coordinate system 20 of FIG. 1A, the data collection processing unit 400 calculates the sun-line of sight vector 40 in an earth coordinate system at the current position and the current time point, using current time information obtained by the clock of the inertial navigation system and position information obtained by the inertial navigation system 100. For the relational expression used at this time, an expression available from an international astronomical almanac and based on solar geometry is used. Each of the altitude angle and the azimuth angle has precision corresponding to an error range within 0.09 degrees. The coordinates of the sun-line of sight vector 40 in the navigation coordinate system 20 obtained in this way are transformed into those of the sun-line of sight vector in the body coordinate system 30 using the attitude value of the inertial navigation system 100. This value must be identical to the sun-line of sight vector 40 in the body coordinate system 30, which is obtained by the camera-type solar sensor 200 when no error exists in the inertial navigation system 100.

As shown in FIG. 3, the inertial navigation system 100 measures angular velocity and acceleration using inertial sensors 101, such as a gyroscope and an accelerometer. In this case, according to the characteristics of the sensors, bias and noise are included in measurements. An integral calculation process is performed on the measured angular velocity and acceleration, and thus attitude, velocity, and position are calculated. Therefore, due to the error of the inertial sensors 101, the attitude, velocity and position values also have errors. The camera-type solar sensor 200 outputs a signal that includes noise. By using the difference between the two unreliable signals, an error in attitude can be estimated through the algorithm of the Kalman filter 50 for minimizing the mean square error between an actual value and an estimated value. The attitude error estimated in this way is transmitted to the inertial navigation system 100. The estimated attitude error, occurring when the sun 10 escapes from the photographic field of view due to the large motion of the airplane and the camera 201 is temporarily unable to capture the sun 10, is not transmitted to the inertial navigation system. If the sun 10 is captured again, the data of the solar sensor 200 is applied to the algorithm of the Kalman filter 50 in consideration of the time difference between the missed time point at which the sun was not captured and a time point at which the sun 10 is captured again.

The operation processor 102 of the inertial navigation system 100 includes the estimated attitude error value received from the data collection processing unit 400 in the calculations. Methods of including the estimated attitude error value in the calculations include a method of directly including the estimated attitude error value in the calculations during an integral calculation process, and a method of accounting for the estimated attitude error value after the integral calculation process has been completed. The algorithm of the Kalman filter 50 of the data collection processing unit 400 is changed accordingly. The former ultimately yields excellent results, but the latter must be considered because most inertial navigation systems 100 are finished products and thus their integral calculation processes cannot be revised.

Hereinafter, another embodiment of an attitude correction apparatus for an inertial navigation system using a camera-type solar sensor according to the present invention is described with reference to FIG. 7.

Unlike the previous embodiment, in which the clock and the position of an inertial navigation system are used, this embodiment is implemented such that a Global Positioning System (GPS) 60 is added as an auxiliary sensor. As shown in FIG. 7, a solar sensor 200 uses a measured attitude value, and the GPS 60 uses measured velocity and position values, thus improving the precision of velocity and position as well as attitude. Similarly, on the basis of the differences between the measured values and the velocity, the position and attitude values obtained by the inertial navigation system 100, the velocity, the position, and the attitude are corrected using a Kalman filter 50 for minimizing the mean square error between an actual value and an estimated value. If the GPS 60 is used, more precise time information can be used to calculate a sun-line of sight vector in a navigation coordinate system 20, thus obtaining a greater advantage in the correction of attitude. The problem of asynchronization caused by the use of two auxiliary sensors can be solved using distributed Kalman filters for performing the Kalman filter algorithm with respect to respective auxiliary sensors.

Next, a further embodiment of an attitude correction apparatus for an inertial navigation system using a camera-type solar sensor according to the present invention is described in detail with reference to FIG. 8.

Unlike the previous embodiment, in which limitation of the field of view of the camera 201 is compensated for using the camera driving motor unit 202, this embodiment is implemented such that a camera-type solar sensor 200 includes a camera 201, and an image acquisition processor 203 for acquiring an image required for data processing from the camera 201 and detecting the position of the sun 10 in the acquired image, and such that two or more cameras 201 are installed on the circumference of the body of an airplane, as shown in FIG. 8, to make up for the insufficient field of view. Accordingly, the camera driving motor unit 202 is not necessary in this embodiment. Therefore, this embodiment is implemented as described above, so that the decrease in precision, which may occur when the camera driving motor unit 202 is used, can be eliminated.

Further, because several cameras 201 are used, the amount of data that must be processed by a single image acquisition processor 203 increases, and thus a plurality of image acquisition processors 203 is preferably provided with respect to each camera 201. Each image acquisition processor 203 calculates a sun-line of sight vector 40 in a camera coordinate system from the acquired image of the sun 10, performs coordinate transformation between the camera coordinate system and the body coordinate system 30 of an airplane, and thus calculates a final sun-line of sight vector 40 in the body coordinate system 30 of the airplane. In this case, the signal processing unit 300 selectively acquires camera data from the image acquisition processors 203 of the camera 201, with which the image of the sun 10 was acquired, among the plurality of cameras 201.

Hereinafter, an attitude correction method for an inertial navigation system using a solar sensor according to the preset invention is described in detail.

First, in order to calculate a sun-line of sight vector 40 in the navigation coordinate system 20 of FIG. 1A, a sun-line of sight vector 40 in an earth coordinate system at a current position and a current time point is calculated using current time information obtained by the clock of the inertial navigation system and the position information obtained by the inertial navigation system 100. For the relational expression used at this time, an expression presented in an international astronomical almanac and based on solar geometry is used. Each of an altitude angle and an azimuth angle has precision corresponding to an error range within 0.09 degrees.

The coordinates of the sun-line of sight vector 40 in the navigation coordinate system 20 obtained in this way are transformed into those of the sun-line of sight vector in the body coordinate system 30 using the attitude value of the inertial navigation system 100. This value must be identical to the sun-line of sight vector 40 in the body coordinate system 30 of FIG. 1B, which is obtained by the camera-type solar sensor 200 when no error exists in the inertial navigation system 100.

Therefore, through the comparison of the sun-line of sight vector 40 in the navigation coordinate system 20 with the sun-line of sight vector 40 in the body coordinate system 30, generated by the camera-type solar sensor 200, information about the attitude of an airplane is extracted, and an error in attitude is corrected using the extracted attitude information.

In detail, the attitude correction method for the inertial navigation system using the camera-type solar sensor according to the present invention includes steps a) to e). At step a), the camera 201 captures the image of the sun 10 through the rotation of the panning shaft driving motor 202a and the tilting shaft driving motor 202b of the camera driving motor unit 202, included in the camera-type solar sensor 200. At step b), the image acquisition processor 203 receives the captured image of the sun 10, detects the center position of the sun 10, and calculates the sun-line of sight vector 40 in the body coordinate system 30 in consideration of the angle of the motion of the camera driving motor unit 202. At step c), the sun-line of sight vector 40 calculated at step b) is synchronized with the attitude, velocity and position information, obtained by the inertial navigation system 100, using the signal synchronization microprocessor 301 of the signal processing unit 300. At step d), the data collection processor 401 of the data collection processing unit 400 receives the synchronized information and thus estimates an error in attitude using a Kalman filter 50, which is an algorithm for minimizing the mean square error between an actual value and an estimated value. At step e), the estimated error is transmitted again to the inertial navigation system 100, and thus the attitude of the airplane is corrected.

In this case, the sun-line of sight vector 40 can be calculated using the above-described trigonometric function. The signal synchronization microprocessor 301 of the signal processing unit 300 synchronizes the data of the inertial navigation system 100 with the data of the camera-type solar sensor 200 and transmits the synchronized data to the data collection processing unit 400 when the data of the camera-type solar sensor 200 is updated with respect to the inertial navigation system 100, which has a relatively short calculation time and the camera-type solar sensor 200, which has a relatively long calculation time. Further, the inertial navigation system 100 measures angular velocity and acceleration using inertial sensors 101, such as a gyroscope and an accelerometer. In this case, according to the characteristic of the sensors, bias and noise are included in measurements. An integral calculation process is performed on the measured angular velocity and acceleration, and thus attitude, velocity, and position are calculated. Due to the error of the inertial sensors 101, attitude, velocity and position values also have errors, and the camera-type solar sensor 200 outputs a signal that includes noise. Using the difference between the two unreliable signals, an error in attitude can be estimated through the algorithm of the Kalman filter 50 for minimizing the mean square error between an actual value and an estimated value.

In this case, an estimated attitude error, occurring when the sun 10 escapes from a photographing range due to the large motion of the airplane and such that the camera 201 is temporarily unable to capture the sun 10, is not transmitted to the inertial navigation system. When the sun 10 is captured again, data of the solar sensor 200 is applied to the algorithm of the Kalman filter 50 in consideration of the time difference between the missed time point and the time point at which the sun is captured again, and an error in attitude is re-estimated.

As described above, the error estimated by the data collection processing unit 400 is transmitted to the inertial navigation system 100 again, and is included in calculations by the operation processor 102, and thus the attitude of the airplane can be corrected.

Further, the GPS 60 may be added as an auxiliary sensor in addition to the solar sensor 200, so that the precision of velocity and position can be improved, and more precise time information can be used to calculate a sun-line of sight vector 40 in a navigation coordinate system 20. The problem of asynchronization caused by the use of two auxiliary sensors can be solved using distributed Kalman filters for performing the Kalman filter algorithm for respective auxiliary sensors.

As described above, the present invention provides an attitude correction apparatus and method for an inertial navigation system using a camera-type solar sensor, which are advantageous in that they provide a new concept of a structure for greatly improving the precision and reliability of an integrated navigation system for unmanned aerial vehicles, thus securing new basic technology in a context of intense competition occurring on the basis of similar concepts and technical levels, as is the case at the present time.

Further, the present invention is advantageous in that an unmanned aerial vehicle having excellent utility is developed, so that new markets based on various uses will be created, thus contributing to advanced development and activating the economy. Moreover, the present invention is also advantageous in that, when the technology for correcting the attitude of an airplane using the sun-line of sight vector presented in the present invention is applied and developed, current technology can be developed into advanced technology for correcting the attitude using various reference vectors which are naturally or artificially constructed. Ultimately, the present invention can contribute to the development of a system that uses complicated image data.

Further, the present invention is advantageous in that it enables easy implementation of an attitude correction apparatus for an inertial navigation system using a camera-type solar sensor, which is insensitive to variation in external environments and can operate normally without requiring a GPS, using a sun-line of sight vector, which can be easily and simply acquired, and is also advantageous in that it can continuously detect the position of the sun through the three-dimensional motion of a camera driving motor unit composed of a panning shaft driving motor and a tilting shaft driving motor, thus more precisely correcting the attitude of an airplane.

Although the preferred embodiments of the present invention described above have been disclosed for illustrative purposes, those skilled in the art will appreciate that various modifications, additions and substitutions are possible, without departing from the scope and spirit of the invention as disclosed in the accompanying claims.

What is claimed is:

1. An attitude correction apparatus for an inertial navigation system using a camera-type solar sensor, comprising:
    a camera-type solar sensor for detecting a sun using a camera in order to measure an attitude of an airplane;
    a signal processing unit for receiving attitude and position values from the inertial navigation system and information about a sun-line of sight vector from the camera-type solar sensor, and synchronizing the attitude and position values with the sun-line of sight vector information; and
    a data collection processing unit for performing post-processing on information received from the signal processing unit, thus correcting an error,
    the camera-type solar sensor comprises:
    the camera;
    a camera driving motor unit, on which the camera is mounted, and which is adapted to perform rotational motion; and
    an image acquisition processor for acquiring an image required for data processing from the camera, and detecting a position of the sun from the acquired image.

2. The attitude correction apparatus according to claim 1, wherein the camera driving motor unit is implemented using a driving motor having two shafts for tilting and panning to perform three-dimensional motion of the camera.

3. The attitude correction apparatus according to claim 1, wherein the camera driving motor unit comprises:
    a panning shaft driving motor;
    a panning rotating plate coupled to and rotated along with the panning shaft driving motor;
    a panning shaft installed on a center portion of the panning rotating plate;
    a tilting shaft driving motor installed on the panning shaft;
    first and second tilting shaft driving motor gears coupled to and rotated along with the tilting shaft driving motor;
    a tilting shaft installed on the second tilting shaft driving motor gear;
    a tilting rotating plate installed on the tilting shaft, and adapted to fixedly install the camera on the tilting rotating plate; and
    tilting shaft supports for supporting both ends of the tilting shaft.

4. The attitude correction apparatus according to claim 1, wherein the camera-type solar sensor comprises:
    the camera; and
    an image acquisition processor for acquiring an image required for data processing from the camera and detecting a position of a sun from the acquired image, and
    wherein two or more camera-type solar sensors are installed along a body of the airplane.

5. The attitude correction apparatus according to claim 1, wherein the data correction processing unit receives the values from the inertial navigation system and the solar sensor and thus calculates an estimated error value using a Kalman filter algorithm.

6. The attitude correction apparatus according to claim 4, wherein the data collection processing unit further comprises a Global Positioning System (GPS) in addition to the inertial navigation system and the solar sensor, thus more precisely calculating estimated errors of velocity and position, as well as an estimated error in attitude, using the Kalman filter algorithm.

7. An attitude correction method for an inertial navigation system using a camera-type solar sensor, wherein information about an attitude of an airplane is extracted through comparison of a sun-line of sight vector in a navigation coordinate system with a sun-line of sight vector in a body coordinate system generated by the camera-type solar sensor, and an error in attitude is corrected using the information about the attitude of the airplane, wherein a method of correcting the error in attitude comprises the steps of
    (a) a camera capturing an image of a sun through rotation of a camera driving motor unit included in the camera-type solar sensor;
    (b) an image acquisition processor receiving the captured image, and thus calculating the sun-line of sight vector in the body coordinate system in consideration of an angle of motion of the camera driving motor unit;
    (c) synchronizing the sun-line of sight vector, calculated at step (b), with information about attitude, velocity and position obtained by an inertial navigation system, using a signal synchronization microprocessor of a signal processing unit;
    (d) a data collection processor of a data collection processing unit receiving the synchronized information, and estimating an error in attitude using a Kalman filter, which is an algorithm for minimizing a mean square error between an actual value and an estimated value; and
    (e) transmitting the estimated error to the inertial navigation system, thus correcting the attitude of the airplane.

8. The attitude correction method according to claim 7, further comprising the step of re-estimating an error in attitude by applying a time difference between a missed time point at which the sun was not captured and a time point at which the sun is captured again, to the Kalman filter algorithm when the camera is temporarily unable to capture the sun, between steps (d) and (e).

* * * * *